(12) United States Patent
Mathewson et al.

(10) Patent No.: US 8,017,900 B2
(45) Date of Patent: Sep. 13, 2011

(54) PHOTON COUNTING APPARATUS

(75) Inventors: Alan Mathewson, Currabinny (IE);
John Carlton Jackson, Palmerstown (IE)

(73) Assignee: SensL Technologies Ltd., Cork (IE)

( * ) Notice: Subject to any disclaimer, the term of this patent is extended or adjusted under 35 U.S.C. 154(b) by 382 days.

(21) Appl. No.: 11/915,541

(22) PCT Filed: May 26, 2006

(86) PCT No.: PCT/GB2006/050122
§ 371 (c)(1),
(2), (4) Date: Jun. 30, 2008

(87) PCT Pub. No.: WO2006/126026
PCT Pub. Date: Nov. 30, 2006

(65) Prior Publication Data
US 2008/0290259 A1 Nov. 27, 2008

(30) Foreign Application Priority Data
May 27, 2005 (GB) .................................. 0510758.6

(51) Int. Cl.
*H01J 40/14* (2006.01)
*H03K 17/78* (2006.01)
*H04N 3/14* (2006.01)
*H01L 31/062* (2006.01)

(52) U.S. Cl. ............. 250/214 R; 250/214 SW; 348/308; 257/292

(58) Field of Classification Search ............... 250/208.1, 250/214 R, 214 SW, 214 LS, 214 A, 214 LA, 250/214 AG, 214 AL, 214 C, 370.14, 206, 250/216; 257/113, 127, 170, 290, 438, 291, 257/292; 324/123 R; 372/8, 50; 330/59; 348/234, 300, 301, 308; 327/514, 516, 520
See application file for complete search history.

(56) References Cited

U.S. PATENT DOCUMENTS
5,214,274 A * 5/1993 Yang .......................... 250/208.1
(Continued)

FOREIGN PATENT DOCUMENTS
EP 0 675 345 A2 3/1995
(Continued)

OTHER PUBLICATIONS
International Search Report for corresponding Application No. PCT/GB2006/050122 mailed Sep. 6, 2006.
(Continued)

*Primary Examiner* — Georgia Epps
*Assistant Examiner* — Don Williams
(74) *Attorney, Agent, or Firm* — Renner, Otto, Boissell & Sklar, LLP

(57) ABSTRACT

An apparatus for photon counting is disclosed that comprises a sensor element (5) comprising a photon detector (8) and a capacitance (2) for applying a potential difference across the detector (8). The apparatus also comprises switching circuitry (6) for connecting the sensor element (5) operatively to a voltage source (4) during a refresh period to charge the capacitance (2) to achieve a predetermined potential difference across the detector (8) above a threshold value, and for substantially isolating the sensor element (5) from the voltage source (4) during a sensing period in which the charged capacitance (2) maintains a potential difference across the detector (8) above the threshold value and in which the detection of a photon by the detector (8) causes at least some of the charge on the capacitance (2) to discharge through the detector (8). The apparatus also comprises control circuitry (12) for controlling the switching circuitry (6) to initiate refresh and sensing periods in alternating sequence. In one aspect, the control circuitry (12) is adapted to control the switching circuitry (6) to initiate successive refresh periods at predetermined intervals.

52 Claims, 8 Drawing Sheets

U.S. PATENT DOCUMENTS

| | | | |
|---|---|---|---|
| 5,929,434 A * | 7/1999 | Kozlowski et al. | 250/214 A |
| 6,246,436 B1 | 6/2001 | Lin et al. | |
| 2003/0001080 A1 | 1/2003 | Kummaraguntla et al. | |
| 2003/0136915 A1 | 7/2003 | Wany | |

FOREIGN PATENT DOCUMENTS

| | | |
|---|---|---|
| EP | 0 897 214 A2 | 2/1999 |
| EP | 1 132 725 | 9/2001 |
| WO | 03/032394 | 4/2003 |

OTHER PUBLICATIONS

British Search Report for corresponding Application No. 0510758.6 dated Aug. 8, 2005.

B. F. Aull et al.; "Geiger-mode avalanche photodiodes for three-dimensional imaging"; The Lincoln Laboratory Journal; New York, NY; vol. 13 No. 2; 2002; pp. 335-350; XP002312996.

* cited by examiner

PHOTON COUNTING APPARATUS

The present invention relates to a photon counting apparatus.

Geiger-mode avalanche photodiodes are intended for operation above the diode's breakdown voltage, with the large electric field inherent in operating the diode above the breakdown voltage allowing the diode to be sensitive to a single photon of light incident upon the detector. A single photon entering into the detector produces an electron hole pair, and the pn diode then separates the charge carriers (electrons or holes), amplifying the separated carrier. By setting the operating voltage above the breakdown voltage, a self-sustaining avalanche is possible. In typical operation, this self-sustaining avalanche must be lowered through passive or active quenching circuits to below the breakdown voltage. Known devices are generally required to quench a photon counting detector in the fastest time possible.

U.S. Pat. No. 6,541,752 "Monolithic Circuit of Active Quenching and Active Reset for Avalanche Photodiodes" discloses the monolithic integration of transistors with nmos and pmos transistors. With this approach, the quench circuit relies on the fast detection of the breakdown event by the integrated quench circuit. In one example, the detector is allowed to break down until the circuitry is able to react to the increase in potential/charge at the sense node and produce a suitable voltage pulse to actively lower the voltage on the diode to below the breakdown voltage. The device must then actively or passively reset the voltage on the detector to above the breakdown voltage so that a new photon can be detected.

U.S. Pat. No. 4,945,227 "Avalanche Photodiode Quenching Circuit" discloses a sensor device in which the diode is biased through a low resistance series with the diode for recharging the photodiode. A comparator is buffered from the diode through a Schottky diode. During a breakdown event, the comparator must react very quickly to increases in the voltage at the sense node to lower the bias on the diode.

U.S. Pat. No. 5,194,727 "Avalanche Photodiode Quenching Circuit with Resetting Means Having a Second Amplifier" discloses circuit amplifiers to provide latching of a comparator which monitors for the breakdown of the avalanche photodiode. This circuit is set up for high speed operation, ~40 MHz.

U.S. Pat. No. 5,168,154 "Electrical Avalanche Photodiode Quenching Circuit" discloses the use of a current source to bias a photodiode. Two inputs are provided to the comparator which are fed by the current source. During breakdown, the inputs to the comparator are altered by the current flowing through the circuit. This variation causes the output of the comparator to switch state and thus quench the detector.

U.S. Pat. No. 5,532,474 "Active quench circuit and reset circuit for avalanche photodiode" discloses a special inductor-based circuit to provide a negative voltage based quench platform. The inductor is used to prevent the flow of current to the positive power supply and to help in resetting the APD node as quickly as possible.

The paper "Geiger-Mode Avalanche Photodiodes for Three-Dimensional Imaging", Brian F. Aull, et. al., Lincoln Laboratory Journal, vol. 13, no. 2, 2002, describes a manner in which a transistor switch is used to bias the capacitance of a photon counting diode. The transistor switch is closed to allow the diode to charge to its full potential and then it is open circuited to allow the device to detect a photon event. The circuitry then monitors the state of the diode for any changes in the voltage on it. When the changes occur, the event is immediately time-stamped and recorded to the exterior.

Known circuitry relies on the full avalanche of the detector during a breakdown event. It is required that the device fully breaks down and that a current of significant magnitude flows for a duration long enough that the output can be sensed by a comparator or other voltage/current sensing electronics. This means that a large current must flow through the detector during a breakdown event, which in turn increases the after-pulsing and increases optical coupling. After-pulsing is caused by trapped charge during breakdown events being released after the device has been reset and is operational again. Optical coupling is caused by the flow of current through a detector which is measured at ~2E-5 photons generated for every electron which passes through the diode's depletion region.

According to the present invention there is provided apparatus comprising: a sensor element comprising a photon detector and a capacitance for applying a potential difference across the detector; switching circuitry for connecting the sensor element operatively to a voltage source during a refresh period to charge the capacitance to achieve a predetermined potential difference across the detector above a threshold value, and for substantially isolating the sensor element from the voltage source during a sensing period in which the charged capacitance maintains a potential difference across the detector above the threshold value and in which the detection of a photon by the detector causes at least some of the charge on the capacitance to discharge through the detector; and control circuitry for controlling the switching circuitry to initiate refresh and sensing periods in alternating sequence, wherein the control circuitry is adapted to control the switching circuitry to initiate successive refresh periods at predetermined regular intervals.

The detector may comprise an avalanche photodiode, and the potential difference may be a reverse bias potential difference. The threshold value may be that required to achieve Geiger mode operation of the photodiode. The threshold value may be the breakdown voltage of the photodiode.

The control circuitry may be adapted to control the switching circuitry in dependence on a timing signal. The timing signal may be a clock signal.

The control circuitry may be adapted to control the switching circuitry to initiate successive sensing periods at predetermined regular intervals.

The control circuitry may be adapted to interrogate the sensor element at predetermined regular intervals to determine whether a discharge has occurred.

The control circuitry may be adapted to interrogate the sensor element before a refresh period is initiated.

The control circuitry may be adapted to interrogate the sensor element during a refresh period.

The control circuitry may be adapted to control the switching circuitry in dependence upon a property of the sensor element. The control circuitry may be adapted to determine from the property whether a discharge has occurred. The control circuitry may be adapted to determine the timing of the discharge from the property. The property may be the potential difference across the sensor element.

The control circuitry may be adapted to initiate a refresh period in response to the detection of a discharge.

The control circuitry may comprise sensing circuitry adapted to output a signal relating to the potential difference across the sensor element.

The signal may indicate whether the potential difference has dropped below a first predetermined level during a sensing period.

The signal may indicate that a discharge has occurred when the potential difference has so dropped.

The control circuitry may be adapted to initiate a refresh period in response to the signal indicating that the potential difference has so dropped.

The first predetermined level may be less than or equal to the threshold value.

The signal may also indicate when the potential difference has so dropped, for providing timing information relating to this event.

The control circuitry may be adapted to initiate a sensing period in response to the signal indicating that the potential difference has risen above a second predetermined level during a refresh period.

The second predetermined level may be greater than or equal to the threshold value.

The signal may also indicate when the potential difference has so risen, for providing timing information relating to this event.

The sensing circuitry may comprise a comparator having one input for receiving a reference voltage for setting the predetermined level and another input for receiving a voltage dependent on the potential difference across the sensor element.

The apparatus may comprise sensing circuitry adapted to sense whether a discharge has occurred.

The sensing circuitry may be adapted to sense whether a discharge occurred in a particular sensing period by determining the amount of charge required to recharge the sensor element during the subsequent refresh period.

The sensing circuitry may be adapted to sense whether a discharge occurred in a particular sensing period by monitoring the voltage across the sensor element during the subsequent refresh period.

The apparatus may comprise photon counting circuitry adapted to update a photon counter in response to the detection of a discharge. The photon counting circuitry may update the photon counter with reference to a dark count or similar reference for the sensor element or apparatus.

The capacitance may comprise a capacitor connected in parallel with the detector.

The capacitance may comprise the parasitic capacitance of the detector.

The capacitance may comprise only the parasitic capacitance of the detector.

The apparatus may comprise a plurality of sensor elements arranged as an array of cells.

The array may be a two-dimensional array.

Each cell of the array may have dedicated switching circuitry. Each cell of the array may have dedicated control circuitry. Each cell of the array may have a dedicated voltage source. Each cell of the array may have dedicated sensing circuitry.

The control circuitry may be operable to control the switching circuitry for a plurality of cells of the array in sequence.

Each cell of the array may have dedicated photon counting circuitry adapted to update a per-cell photon counter in response to the detection of a discharge. The apparatus may comprise circuitry for reading the per-cell photon counters at predetermined regular intervals.

It should be noted that another aspect of the present invention is based on the first aspect of the present invention, having such dedicated photon counting circuitry as mentioned above, but wherein the control circuitry is not necessarily adapted to control the switching circuitry to initiate successive refresh periods at predetermined regular intervals, but may be so adapted.

Each cell of the array may have dedicated circuitry adapted to determine the timing of a discharge.

The control circuitry may be operable selectively to operate only one or more subsets of the cells at a time.

The apparatus may be operable in a mode in which the cells are arranged into a plurality of groups, each group comprising one or more cells, with information regarding light intensity being provided on a per-group basis.

The predetermined potential difference may be within 50% of the threshold value. The predetermined potential difference may be within 25% of the threshold value. The predetermined potential difference may be within 5% of the threshold value. The predetermined potential difference may be within 2% of the threshold value.

The predetermined potential difference may exceed the threshold value by an amount allowing a predetermined length of sensing period before a refresh period is required to recharge the sensor element.

The detection of a photon by the detector may cause the potential difference across the detector to drop substantially to zero.

Therefore, compared with known architectures, an embodiment of the present invention enables a Geiger-mode avalanche photodiode to provide internal quenching without the use of external passive or active quenching circuitry.

An embodiment of the present invention has the ability to quench and detect a photon arrival at the detector with a means of self-limiting the current flowing through the detector. This allows a detector, or array of detectors, to be biased in Geiger-mode, using internal or external capacitance to maintain the electric field of the diode. A major advantage with this approach is that the structure itself is capable of self-limiting the current flow through the detector. Current flow during the breakdown event can be minimised to the theoretically lowest level, which will limit the optical crosstalk and after-pulsing which degrade current device operation and affect all current state-of-the-art technology. An embodiment of the present invention can be applied to photon-counting single detectors, one-dimensional arrays of detectors, and two-dimensional imaging arrays.

Reference will now be made, by way of example, to the accompanying drawings, in which.

Figure 1:
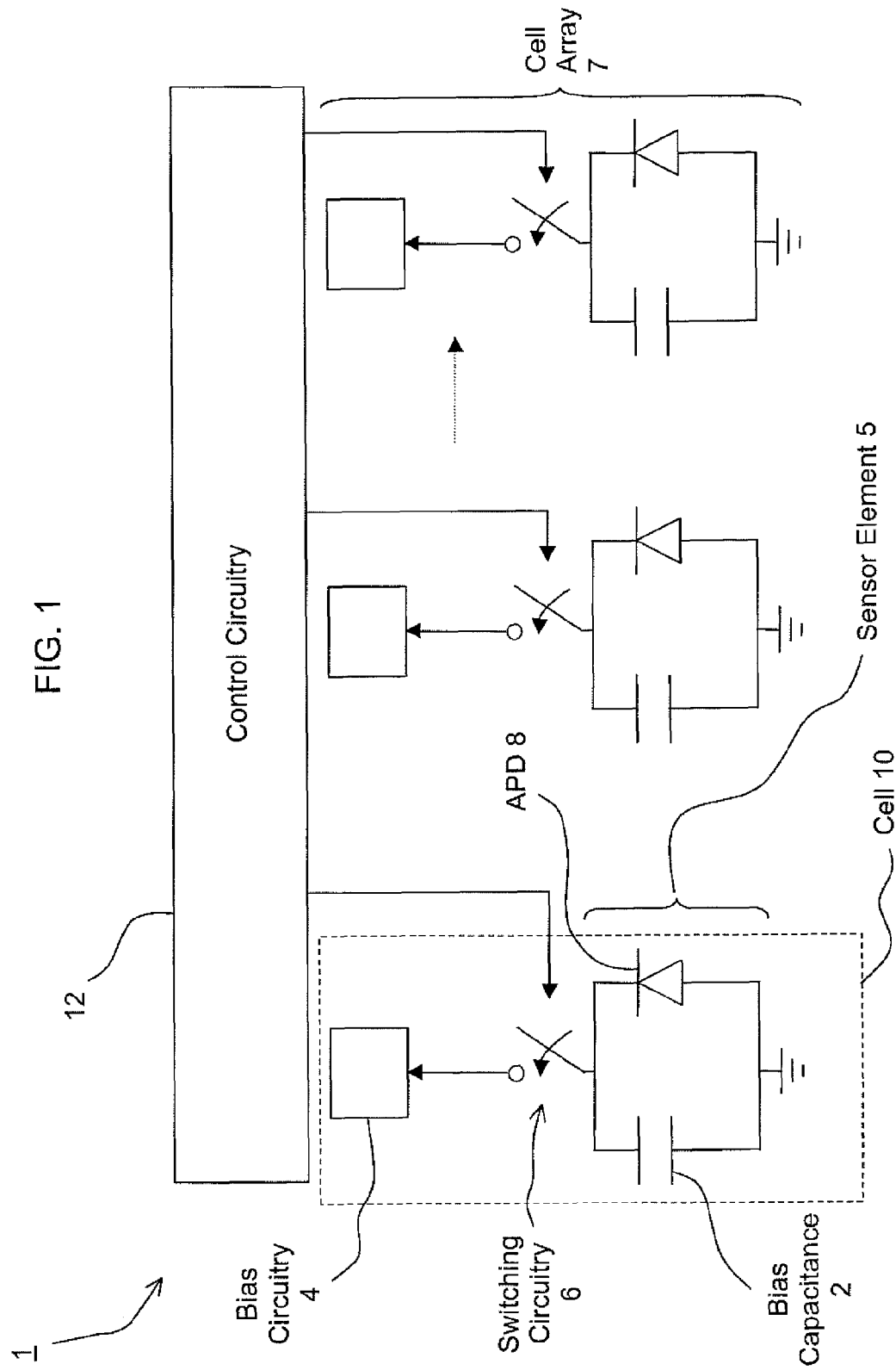
FIG. 1 is an illustrative circuit diagram showing a first embodiment of the present invention.

FIG. 1 is an illustrative circuit diagram showing an apparatus 1 according to a first embodiment of the present invention. The apparatus 1 comprises an array 7 of cells 10 in communication with control circuitry 12. In this embodiment, each cell 10 of the array 7 has the same construction, and accordingly only one of the cells 10 will be referenced with numerals and described herein.

The cell 10 comprises a sensor element 5, itself comprising an avalanche photodiode (APD) photon detector 8 and a capacitance 2 for biasing (applying a potential difference across) the APD 8.

The cell 10 also comprises bias circuitry 4 for supplying a voltage source to the sensor element 5, and switching circuitry 6 disposed between the bias circuitry (voltage source) 4 and the sensor element 5.

During a refresh period, the switching circuitry 6 is actuated to connect the sensor element 5 to the voltage source 4. This charges the bias capacitance 2 to achieve a reverse-bias potential difference across the APD 8 that is greater than the breakdown voltage of the APD 8, so as to enable Geiger mode operation of the APD 8 during a subsequent sensing period.

During a sensing period following after the refresh period, the switching circuitry 6 is actuated to substantially isolate the sensor element 5 from the voltage source 4. During the sensing period, the charged capacitance 2 maintains a reverse-bias potential difference across the APD 8 greater than its breakdown voltage. The detection of a photon by the APD 8 during the sensing period causes the charge on the capacitance 2 to discharge through the APD 8.

The switching circuitry 6 is controlled in this manner by the control circuitry 12 to initiate refresh and sensing periods in alternating sequence. A refresh period can be initiated before a sensing period has ended naturally through a breakdown event or natural discharge. The refresh and sensing periods preferably follow one after the other in quick succession without gaps, but this is not essential; other operations, for example control operations, may be interspersed with the alternating sequence of refresh and sensing periods, and there may be gaps between refresh and sensing periods.

In the first embodiment, the apparatus 1 is operated in a clocked manner, with the control circuitry 12 controlling the switching circuitry 6 to initiate successive refresh periods at predetermined intervals. The control circuitry 12 also controls the switching circuitry 6 to initiate successive sensing periods at predetermined intervals. The timing of the refresh and sensing periods is controlled by a system clock. The control circuitry 12 is also adapted to interrogate the sensor element at predetermined intervals to determine whether a discharge has occurred. This interrogation can take place before a refresh period is initiated, or during a refresh period.

Figure 2:
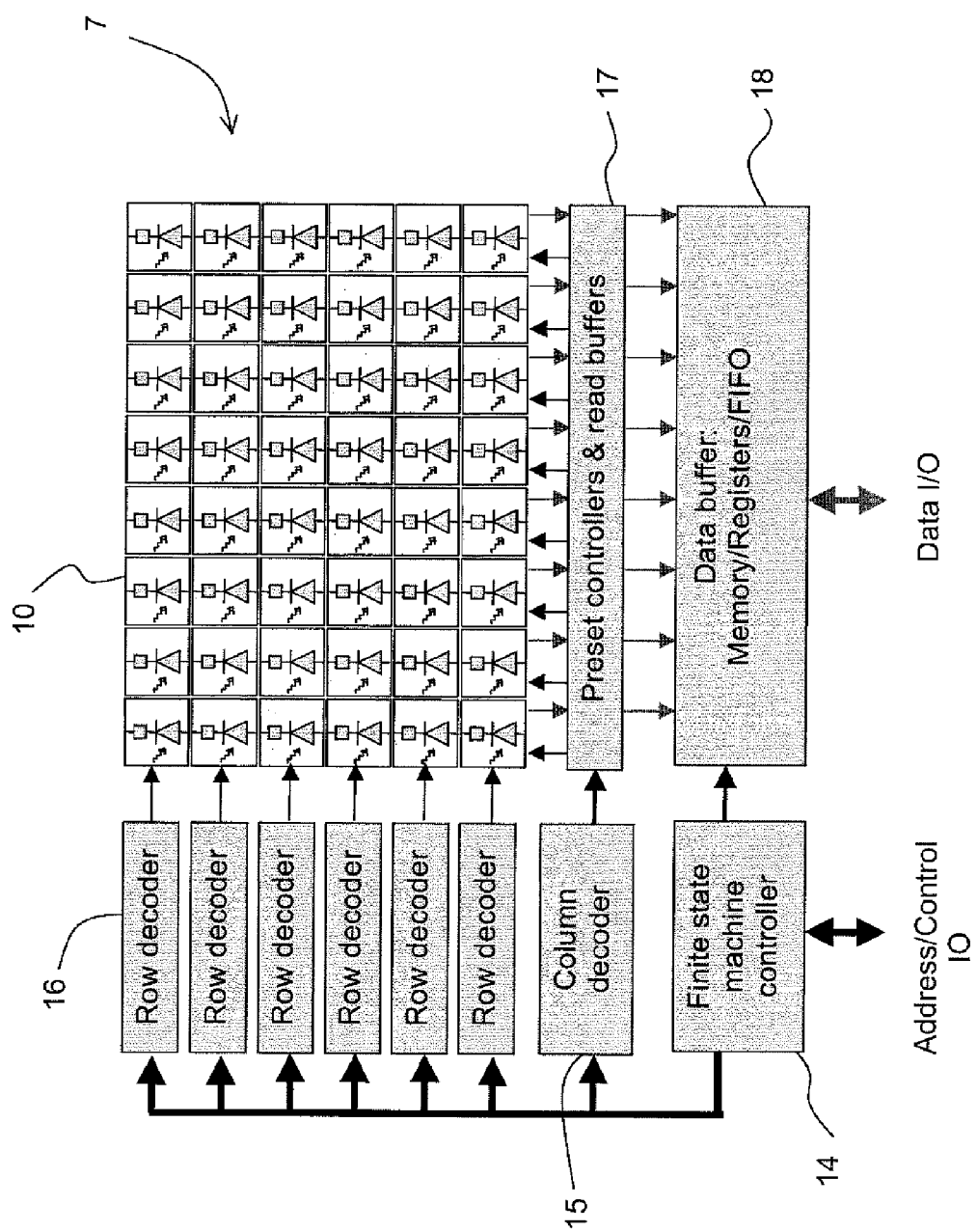
FIG. 2 is a block diagram showing an array implementation embodying the present invention.
Figure 3:
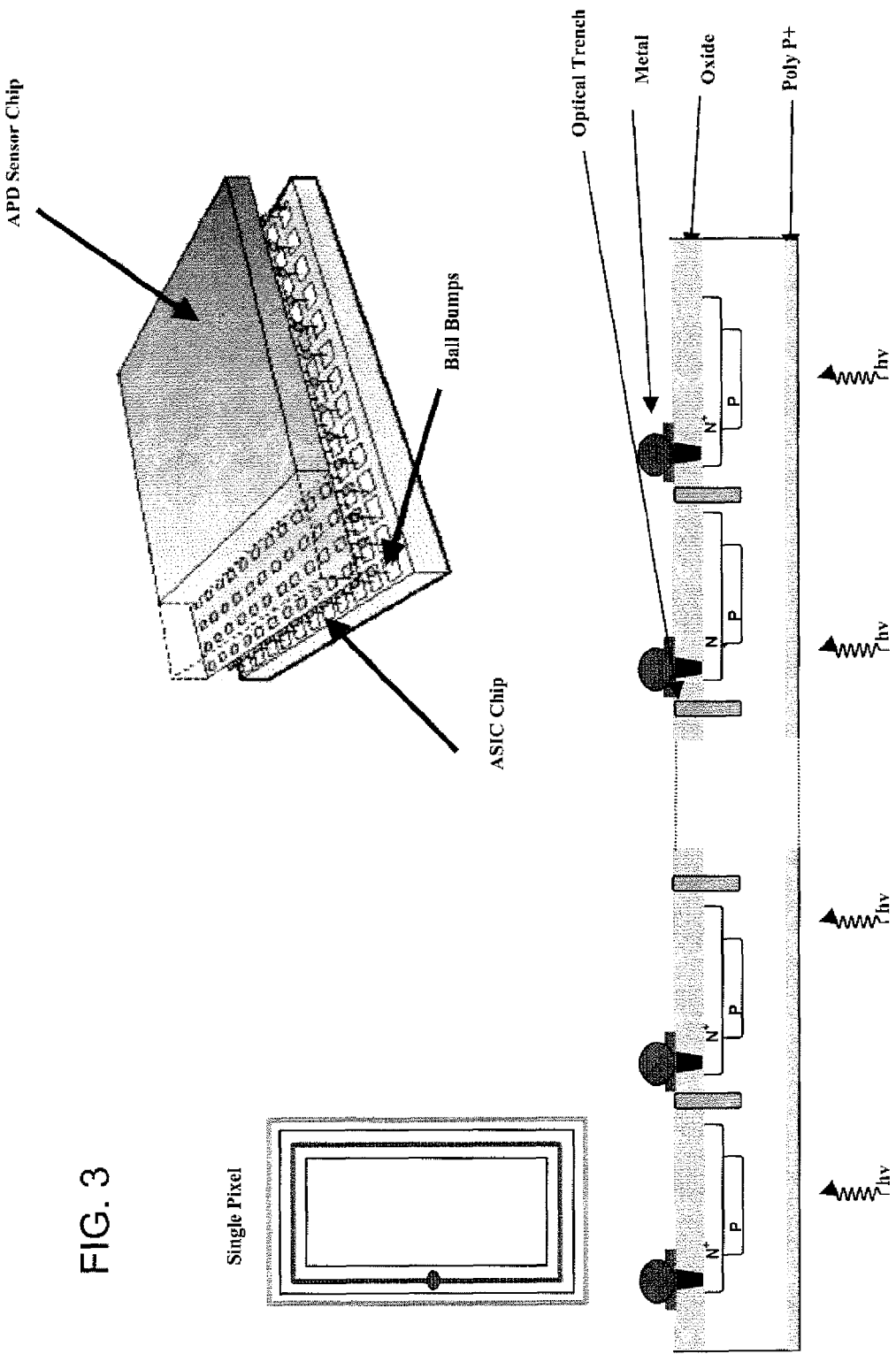
FIG. 3 is an illustrative diagram showing one physical implementation of an embodiment of the present invention.

FIG. 2 is a block diagram illustrating schematically the use of a plurality of cells 10 arranged in a two-dimensional sensor array, surrounded by control circuitry. Address and control IO occurs through a finite state machine controller 14. A column decoder 15 and row decoders 15 decode the address so as to enable random access to any one of the cells in the array using the preset controllers and read buffers. Interrogated information from the accessed cell is stored in the data buffer 18 before passing out on the data I/O line. This is akin to random access memory, with each cell in an embodiment of the present invention storing one bit of information. The content of the cell depends on recent event history, with an event being triggered by a photon hitting the active area of the APD. FIG. 3 shows one possible physical implementation of such a device, in which a sensor array is flip-chipped onto an ASIC (Application Specific Integrated Circuit). Field Programmable Gate Array implementation (FPGA) is also possible.

Therefore, as explained above, an embodiment of the present invention uses a capacitance 2 to hold the diode 8 at a voltage above the breakdown voltage. When the detector 8 turns on because of a photon arrival, the voltage on the holding capacitor 2 and on the APD 8 is lowered to the breakdown voltage or below. This effectively ends the sensing period because the APD 8 is no longer reverse biased to a sufficient extent to enable Geiger mode operation. The sensing period can also be ended by thermally-generated carriers or by the natural discharge of the capacitance 2 over time.

It will be appreciated that, although the bias capacitance 2 is shown and described as being provided by a capacitor element, it is also the case that in many applications the internal parasitic capacitance of the APD 8 itself will be sufficient to provide the required capacitance 2, without the need for any external capacitor element such as that depicted in FIG. 1. In any case, even with an external capacitor element, the parasitic capacitance of the APD 8 will contribute to the overall bias capacitance 2.

A major difference between an embodiment of the present invention and the prior art is that, in an embodiment of the present invention, the only current that flows through the detector 8 during the breakdown event is that which is stored on the APD parasitic and/or external capacitance 2 required to hold the voltage to a suitable level. This presents a new device architecture for photon counting suitable for both single and highly dense arrays of detectors.

An embodiment of the present invention provides a means of setting the voltage on the APD 8 and then leaving the APD 8 for a certain fixed or variable period of time, and a means to detect that a breakdown has occurred and recharge the APD 8 to the required voltage.

An embodiment of the present invention provides a device architecture that allows for photon counting to occur without the need for passive or active quenching circuitry to reset the detector 8 during an avalanche breakdown event. The device architecture operates so that a voltage is applied to the detector 8 and maintained by the internal or external capacitance 2.

The leakage current through the diode 8 is low enough (typically of order of 100 fA) that the voltage can be maintained for a length of time (determined by the RC time constant of the system) sufficient to provide a useful sensing period. Once the diode 8 is biased it can be left for a predetermined length of time, determined at least in part by the capacitance 2.

A photon or thermally-generated electron/hole which comes into the depletion region will cause a breakdown. During the breakdown event, the charge on the capacitor 2 will be discharged through the diode 8 to ground. Because the voltage source 4 is removed from the detector 8, the only current that will flow during the breakdown event is the charge stored on the diode and any external capacitance 2. Once the charge is reduced to a level which results in a potential difference equal to the breakdown voltage, the device will effectively be quenched and turned off, and the sensing period comes to an end.

The external/internal bias circuitry 4 is then re-applied to the diode 8 to refresh the diode voltage to a level above the breakdown voltage. By monitoring the voltage on the diode 8 when the diode is being reset (or topped up), it is possible to determine if a photon has been detected.

Figure 4:
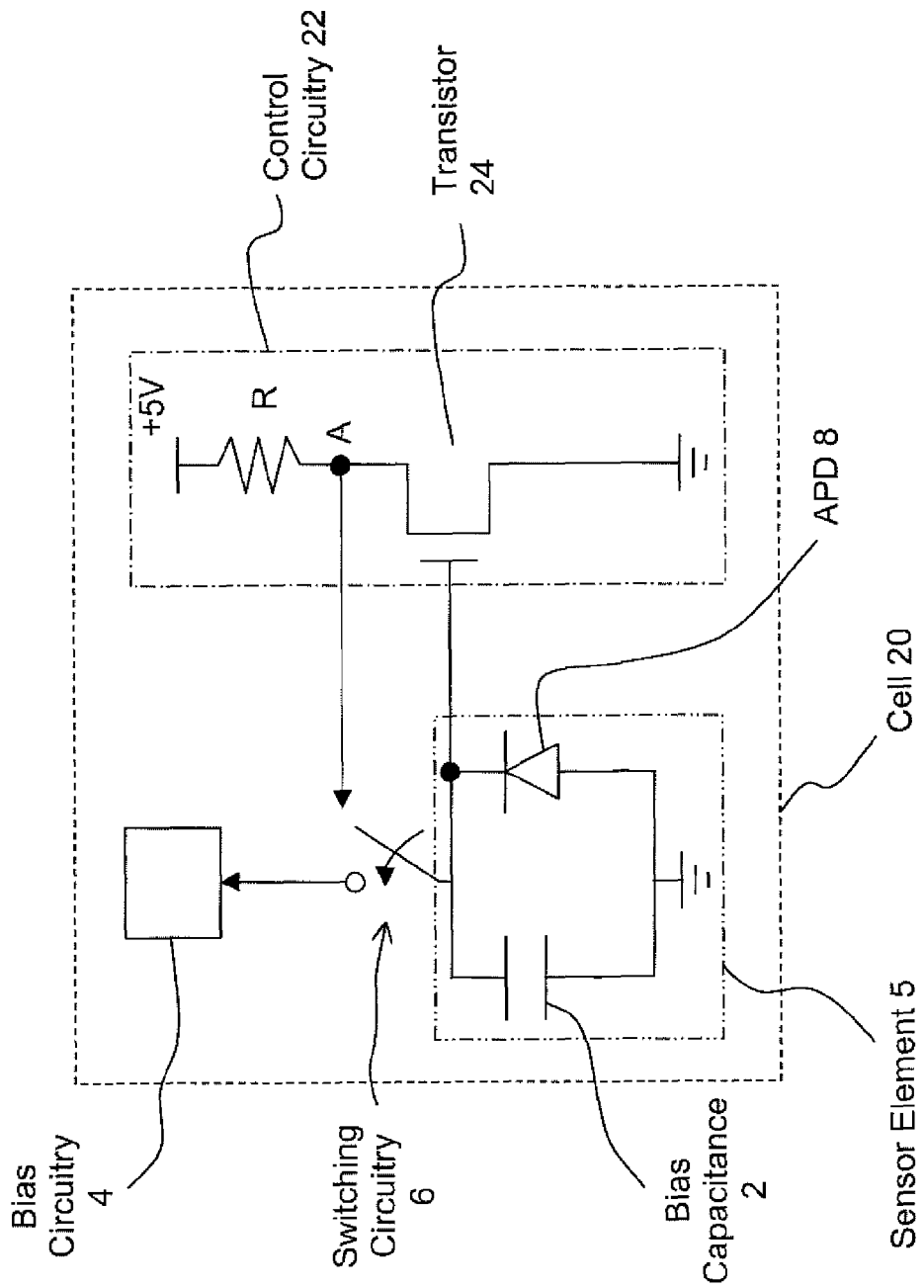
FIG. 4 is an illustrative circuit diagram for use in explaining a second embodiment of the present invention.
Figure 6:
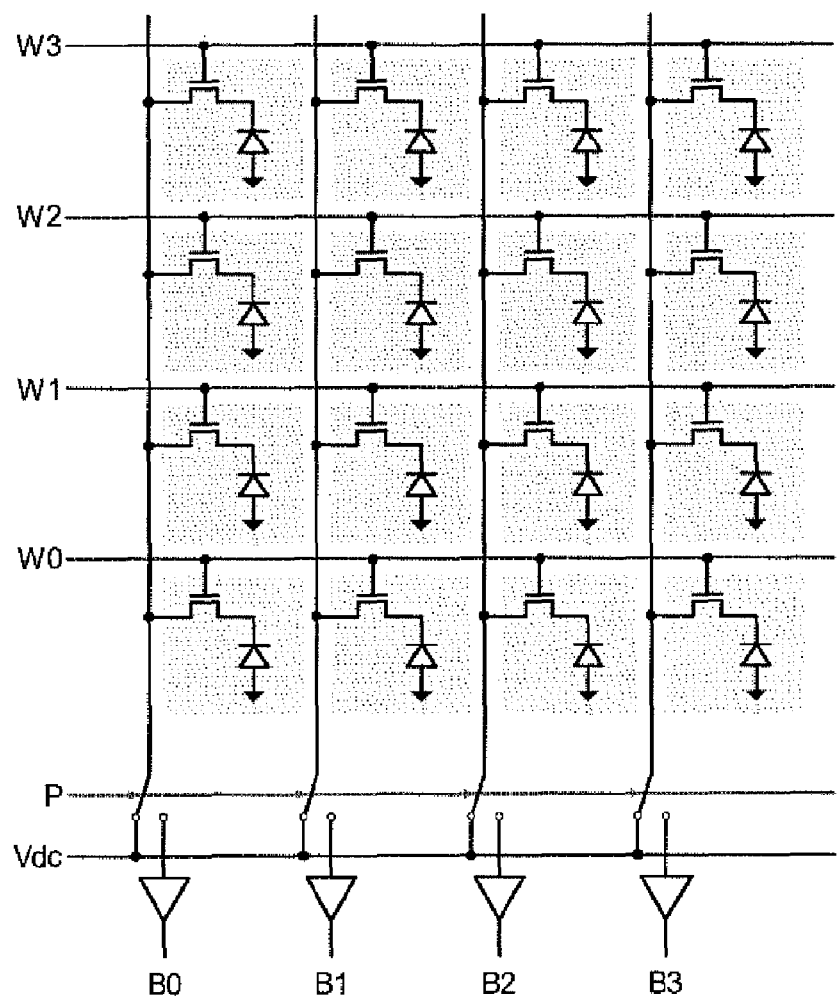
FIGS. 6 to 10 are further diagrams illustrating embodiments of the present invention or aspects thereof.

FIG. 6 shows an example of the architecture that can be used to provide the ability to switch the voltage onto the diodes and then allow the devices to be read out in a scanned manner. The sequence for operation is as follows:

1. Start with no word lines selected (W0-W3)
2. Connect APD bit lines (B0-B3) to buffer inputs
3. Assert word line and read buffer output
4. Switch bit line to charge voltage
5. De-select the word lines before repeating the sequence FIG. 4 is an illustrative circuit diagram for use in explaining a second embodiment of the present invention. In second embodiment of the present invention, a cell 20 includes voltage/current sense capability to detect the presence of a change in the voltage on the APD 8, caused by a breakdown, or the flow of current through the APD 8 to ground. The circuit then signals to the bias circuitry to recharge the APD.

Therefore, while in the first embodiment the apparatus operates only in a fully clocked manner in which the APD 8 is interrogated at set intervals, in the second embodiment the apparatus is also provided with the ability to operate in free-running mode in which the cell 20 can set and reset itself dependent on the photon or breakdown times, thus operating independently.

As shown in FIG. 4, the cell 20 comprises a bias capacitance 2 and APD 8 (sensor element 5), switching circuitry 6 and bias circuitry 4 corresponding to those parts in the first embodiment. In the second embodiment, however, the cell 20 also comprises dedicated control circuitry 22 having an nmos transistor 24 connected between ground and a resistor R, itself connected to a positive voltage source. The gate of the nmos transistor 24 is connected to the cathode of the APD 8, while a control signal to the switching circuitry 6 is taken from a point A between the transistor 24 and the resistor R.

In operation of the second embodiment, during a refresh period the switching circuitry 6 is operated to connect the voltage source 4 to the capacitance 2. The capacitance 2 charges up to a point where the mos transistor 24 turns on, after the APD 8 is sufficiently reverse biased to enable Geiger mode operation. Point A then takes a low value, causing the switching circuitry 6 to isolate the voltage source 4 from the sensor element 5. This commences the sensing period.

During the sensing period, if a photon causes a discharge in the APD 8, the potential difference across the APD 8 will drop to below the breakdown voltage of the APD 8, and this in turn will cause the transistor 24 to turn off. Point A will then take a high value, causing the switching circuitry 6 to connect the voltage source 4 to the sensor element 5. This again commences the refresh period, and the cycle continues in this way.

Figure 5:
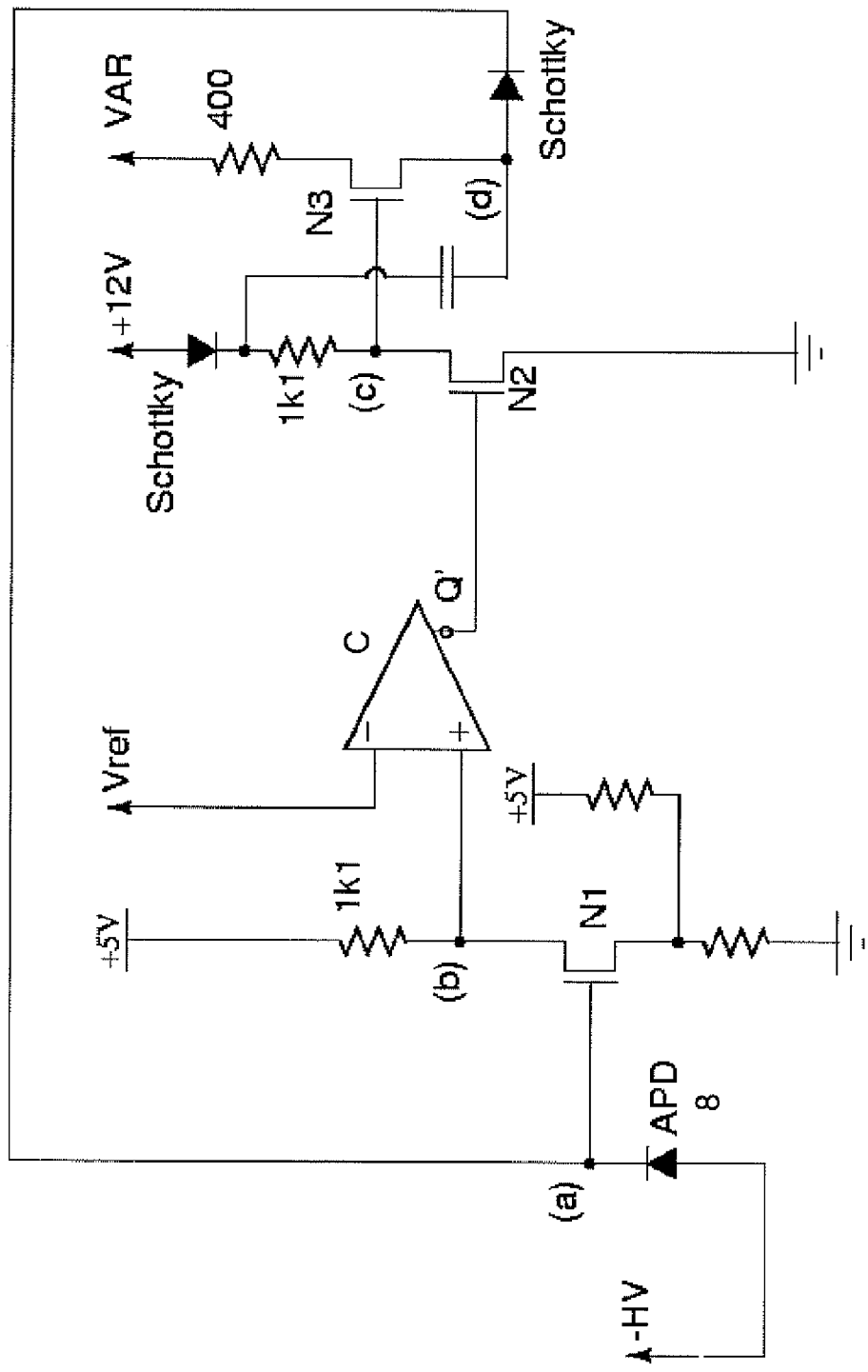
FIG. 5 is an illustrative circuit diagram for use in explaining a second embodiment of the present invention.

FIG. 5 is a circuit diagram showing a third embodiment of the present invention. The third embodiment is similar to the second embodiment, but is more elaborate. The construction of the third embodiment will be readily understood from the circuit diagram shown in FIG. 5, and the operation is as follows.

For operation a high voltage (Vhv) which is below the breakdown voltage is placed on the diodes anode or cathode, depending on the circuit configuration. A voltage (Vex) is then placed on the opposite terminal to bias the diode above the breakdown voltage (Vbr). The total voltage across the diode is therefore Vhv+Vex>Vbr.

During a breakdown event, the voltage at node (a) will be reduced so that the total voltage across the diode is less than the breakdown voltage.

When node (a) is low, transistor N1 is turned off. This causes the voltage on node (b) to increase towards +5V. Node (b) forms the non-inverting input to the comparator C. When this input is above the reference voltage, Vref, the inverted output Q' of the comparator C swings low. When Q' goes low, this causes the transistor N2 to turn off. This in turn causes node (c) to go high, which turns on transistor N3 (corresponding to the switching circuitry of previous embodiments).

When transistor N3 is on, node (d) goes high, from the voltage source VAR. This voltage source VAR connects through a Schottky diode (for speed) to the APD 8, thus restoring the APD bias voltage back to a value greater than the breakdown voltage of the APD 8 in preparation for the sensing period.

This causes transistor N1 to turn on, causing node (b) to go lower than Vref. The low value at the non-inverting input to the comparator C causes the output Q' to go high, turning the transistor N2 on. Node (c) is caused to go low, which turns off transistor N3. This disconnects the voltage source VAR from the APD 8, and thus begins the sensing period.

The sensing period ends, for example, when a photon causes a breakdown, and the cycle repeats as above.

Although the same core architecture is used as described for the previous two embodiments to charge the capacitor and detect that a breakdown has occurred, in the third embodiment timing information is also preserved.

For example, in one mode of operating in the first embodiment, individual cells in an array are operated alternately in refresh and sensing modes according to a system clock, being charged up during a refresh period, left to stand during a sensing period, and then interrogated to determine whether a discharge occurred during the sensing period. This allows the operation of large arrays of detectors but the absolute photon arrive time is lost because of the serial nature of the readout. At best, the timing information would be limiting knowing that the discharge must have occurred at some time during the sensing period.

Having a separate readout circuit for each detector is limited by the size and complexity of the required circuitry both in interrogating large arrays but also in the signal and data processing required to deal with large detector arrays and large amounts of data from those arrays. For smaller arrays, where the timing information of the photon is desired, it is possible by using a dedicated charge and readout circuit for each pixel, to retain photon arrive time, and this is the approach taken with the third embodiment. Another embodiment would include the ability to switch from serial output for the entire array of pixels to a limited number of pixels which operate with a very fast sense period or in a free running mode.

In the third embodiment, each cell is charged by the charge/recharge circuitry. When a breakdown event is detected, the recharge circuitry is used to recharge the device and also to output a signal (from the comparator C). The recharge sets the device operating again and the output signal signifies the arrival time of the photon.

Advantage of this over prior art circuitry are that significantly less current flows through the detector area during a breakdown, causing less pixel to pixel coupling, less heat to be dissipated, less chance of an after-pulse and a very short dead-time of the detector.

Known circuitry requires that the detector must first break down fully to generate a large current flow which can be measured and detected by external (or monolithic) circuitry. This means that each time that a photon is detected it is required that a relatively large current flow through the active area of the photon counter. An embodiment of the present invention instead uses internal and external capacitance to provide bias to the detector. During a breakdown event the charge on the capacitor is removed through the low resistance diode to ground. In one aspect, the circuit then scans the detector again to effectively read/write the individual diode. This allows large arrays with very tight pixel pitch to be formed, limited only by the speed at which the data can be read out by the external/monolithic circuitry that biases the diode.

As described above, an apparatus according to an embodiment of the present invention can be provided with cells that are operated in a clocked fashion but which also have the capability of detecting a breakdown event and initiating a refresh period in response.

It will be appreciated that various features of the above-described embodiments can be combined. It will also be appreciated that the functionality of the circuitry shown and described herein can be provided in many different ways, the particular implementations herein being mere examples.

In another embodiment of the present invention, is cell of the array is provided with its own counter in which is stored the number of times the detector for that cell has fired. The per-cell counters can either be read at predetermined intervals, for example every 1 μs or every 10 μs, they can be read at arbitrary intervals, for example when a counter has reached its maximum count and needs to be reset.

Figure 7:
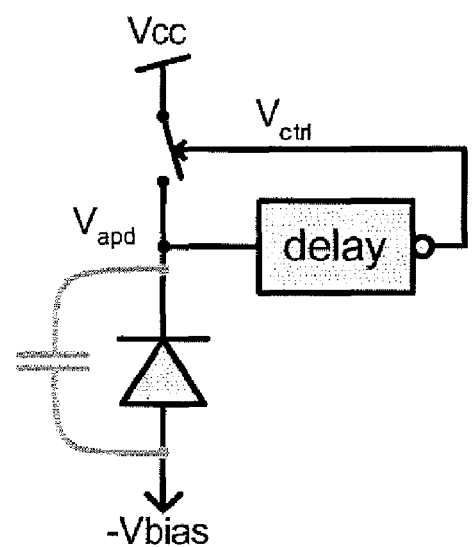
Figure 8:
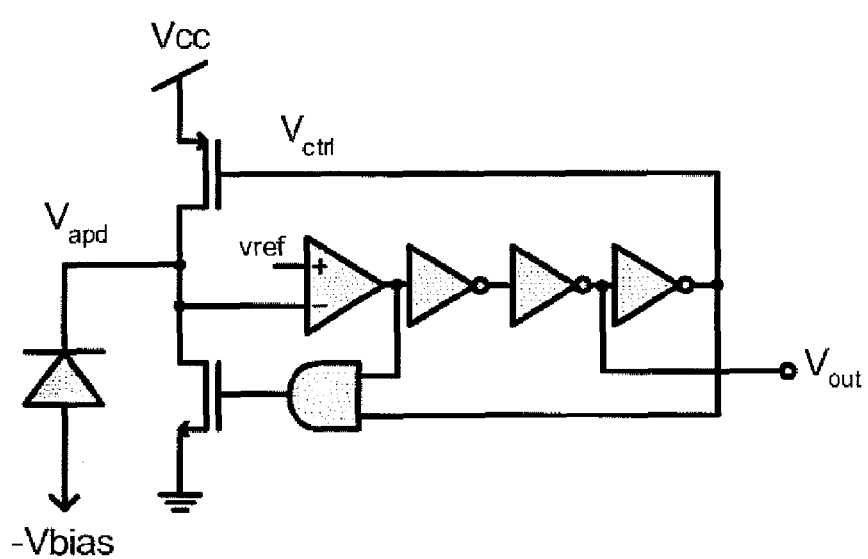

The per-pixel counter may have the ability to reset itself independently of operation from the write/read scanning mechanism. One way to achieve this is would be to provide a delay circuitry in the pixel to reset the device once it has broken down and had a sufficient time to remove the charge from the pixel. Such circuitry is illustrated schematically in FIG. 7, and operates as follows:
1. APD anode is biased at negative breakdown
2. Parasitic capacitance maintains Vapd
3. Incident photon causes Vapd to drop quickly
4. Delay resets device after short time
5. Gives a pulse for every photon which can be counted with appropriate circuitry One possible implementation of the delay circuit is shown in FIG. 8, and this would allow the device to be reset through an active reset mechanism on the top transistor and the bottom transistor could be used to remove any remaining charge on the diode itself.

This is similar to an active quench circuit in which the charge on the diode is actively removed after a breakdown event. This is useful in this instance to optimise the counting mechanism. The inverter chain could be used to delay the reset of the diode. This circuit also has an optional vref input which would allow the threshold of the circuit to be set to allow the fastest operation time possible. Vref does not have to be included for it to work but it will work faster if it is included in the circuit.

Figure 9:
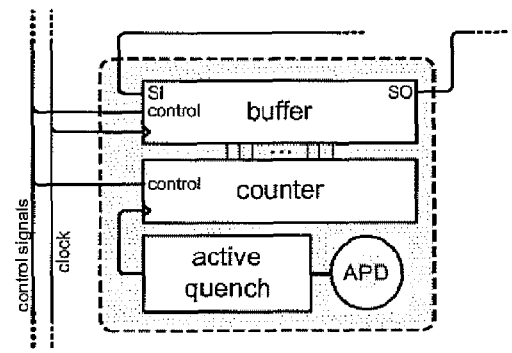

A block level diagram showing the counter, quench and buffer to the outside are shown in FIG. 9. This would allow the device to reset itself and keep counting after an event. The buffer could be read out at a predetermined interval or at any other time, for example when it is full.

Figure 10:
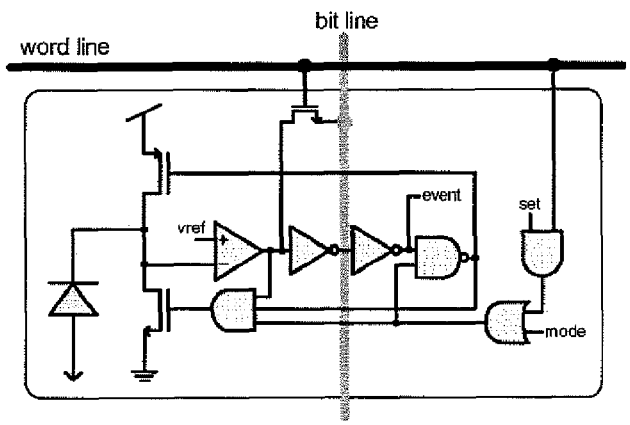
Figure 10:
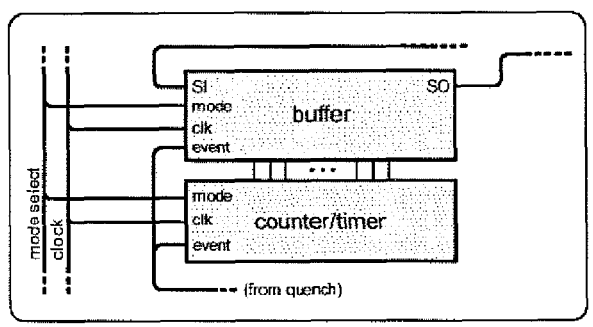

An embodiment of the present invention, for example according to the implementation shown in FIG. 10, can operate in the following three different modes simultaneously by the following:
1. Digital APD
   1. Active quench circuit disabled
   2. Value is read
   3. Set pulse allows active quench
   4. circuit to quench/reset the APD
   5. Move on to next word line
2. Counting
   1. Active quench circuit enabled
   2. Timer/counter increments on events
   3. Sample snapshots value
   4. Scan allows transfer off chip
3. Time Stamping
   1. Active quench circuit enabled
   2. Timer/counter increments on clock
   3. Timer snapshot taken with event
   4. Scan allows transfer off chip An embodiment of the present invention can be operated in a mode in which only a small subset of cells is read/write out of the entire array. This provides an ability to window the array so as to sample only a portion of the array at a single time. This allows a speeding up of the read/write refresh cycle time where that is required, so as to allow the array to operate at higher frequencies, albeit with a lower number of active pixels.

Timing circuitry can also be incorporated within each cell. This allows the device to be able to time the arrival of a photon event. The time stamp that is generated in response to a photon arriving can be read out at a later predetermined time, for example at predetermined intervals, or could be read out immediately.

The windowing ability described above allows the arrival time of a photon to be recorded more accurately. This provides the ability to to operate individual pixels at a higher refresh rate and to allow precision timing of the changes in the individual pixels.

For example, one method of use would first operate the apparatus in a scanning mode across the entire array. Once a particular region of interest is determined, a subset of the array can be selected to allow scanning of that region of interest at a higher rate. This allow the determination of photon arrival times in the smaller subset of the array with a higher level of precision.

It is also possible to provide an apparatus that can operate in a mode in which there is a reduced number of outputs, for example to provide information regarding the light intensity across on the entire array, or regions thereof. This would provide the ability to provide a single output in which the output signal represents the signal level which is incident on the entire array; or a number of pixels can be selected to provide a single output for those pixels only. In this way, the array can be segmented, with an output being provided for each segment. Each segmented output would then provide information regarding the light intensity on that segment.

The output of the system can either be a digital signal or analogue signal. With segmented outputs, this would enable the ability to provide a single analogue output to the outside, or several analogue outputs.

An embodiment of the present invention can be applied, for example, in very low light level imaging applications, Laser Radar/LIDAR/Range Finding applications, TOF applications, and low light imaging applications requiring excellent timing resolution.

The invention claimed is:

1. Apparatus comprising:
   a sensor element comprising a photon detector and a capacitance for applying a potential difference across the detector;
   switching circuitry for connecting the sensor element operatively to a voltage source during a refresh period to charge the capacitance to achieve a predetermined potential difference across the detector above a threshold value, and for substantially isolating the sensor element from the voltage source during a sensing period in which the charged capacitance maintains a potential difference across the detector above the threshold value and in which the detection of a photon by the detector causes at least some of the charge on the capacitance to discharge through the detector; and
   control circuitry for controlling the switching circuitry to initiate refresh and sensing periods in alternating sequence, wherein the control circuitry is adapted to control the switching circuitry to initiate successive refresh periods at predetermined regular intervals.

2. Apparatus as claimed in claim 1, wherein the detector comprises an avalanche photodiode, and wherein the potential difference is a reverse bias potential difference.

3. Apparatus as claimed in claim 2, wherein the threshold value is that required to achieve Geiger mode operation of the photodiode.

4. Apparatus as claimed in claim 3, wherein the threshold value is the breakdown voltage of the photodiode.

5. Apparatus as claimed in claim 1, wherein the control circuitry is adapted to control the switching circuitry in dependence on a timing signal.

6. Apparatus as claimed in claim 5, wherein the timing signal is a clock signal.

7. Apparatus as claimed in claim 1, wherein the control circuitry is adapted to control the switching circuitry to initiate successive sensing periods at predetermined regular intervals.

8. Apparatus as claimed in claim 1, wherein the control circuitry is adapted to interrogate the sensor element at predetermined regular intervals to determine whether a discharge has occurred.

9. Apparatus as claimed in claim 8, wherein the control circuitry is adapted to interrogate the sensor element before a refresh period is initiated.

10. Apparatus as claimed in claim 8, wherein the control circuitry is adapted to interrogate the sensor element during a refresh period.

11. Apparatus as claimed in claim 1, wherein the control circuitry is adapted to control the switching circuitry in dependence upon a property of the sensor element.

12. Apparatus as claimed in claim 11, wherein the control circuitry is adapted to determine from the property whether a discharge has occurred.

13. Apparatus as claimed in claim 12, wherein the control circuitry is adapted to determine the timing of the discharge from the property.

14. Apparatus as claimed in claim 11, wherein the property is the potential difference across the sensor element.

15. Apparatus as claimed in claim 1, wherein the control circuitry is adapted to initiate a refresh period in response to the detection of a discharge.

16. Apparatus as claimed in claim 1, wherein the control circuitry comprises sensing circuitry adapted to output a signal relating to the potential difference across the sensor element.

17. Apparatus as claimed in claim 16, wherein the signal indicates whether the potential difference has dropped below a first predetermined level during a sensing period.

18. Apparatus as claimed in claim 17, wherein the signal indicates that a discharge has occurred when the potential difference has so dropped.

19. Apparatus as claimed in claim 17, wherein the control circuitry is adapted to initiate a refresh period in response to the signal indicating that the potential difference has so dropped.

20. Apparatus as claimed in claim 17, wherein the first predetermined level is less than or equal to the threshold value.

21. Apparatus as claimed in claim 17, wherein the signal also indicates when the potential difference has so dropped, for providing timing information relating to this event.

22. Apparatus as claimed in claim 17, wherein the sensing circuitry comprises a comparator having one input for receiving a reference voltage for setting the predetermined level and another input for receiving a voltage dependent on the potential difference across the sensor element.

23. Apparatus as claimed in claim 16, wherein the control circuitry is adapted to initiate a sensing period in response to the signal indicating that the potential difference has risen above a second predetermined level during a refresh period.

24. Apparatus as claimed in claim 23, wherein the second predetermined level is greater than or equal to the threshold value.

25. Apparatus as claimed in claim 23, wherein the signal also indicates when the potential difference has so risen, for providing timing information relating to this event.

26. Apparatus as claimed in claim 1, comprising sensing circuitry adapted to sense whether a discharge has occurred.

27. Apparatus as claimed in claim 26, wherein the sensing circuitry is adapted to sense whether a discharge occurred in a particular sensing period by determining the amount of charge required to recharge the sensor element during the subsequent refresh period.

28. Apparatus as claimed in claim 26, wherein the sensing circuitry is adapted to sense whether a discharge occurred in a particular sensing period by monitoring the voltage across the sensor element during the subsequent refresh period.

29. Apparatus as claimed in claim 1, comprising photon counting circuitry adapted to update a photon counter in response to the detection of a discharge.

30. Apparatus as claimed in claim 29, wherein the photon counting circuitry updates the photon counter with reference to a dark count or similar reference for the sensor element or apparatus.

31. Apparatus as claimed in claim 1, wherein the capacitance comprises a capacitor connected in parallel with the detector.

32. Apparatus as claimed in claim 1, wherein the capacitance comprises the parasitic capacitance of the detector.

33. Apparatus as claimed in claim 32, wherein the capacitance comprises only the parasitic capacitance of the detector.

34. Apparatus as claimed in claim 1, comprising a plurality of sensor elements arranged as an array of cells.

35. Apparatus as claimed in claim 34, wherein the array is a two-dimensional array.

36. Apparatus as claimed in claim 34, wherein each cell of the array has dedicated switching circuitry.

37. Apparatus as claimed in claim 34, wherein each cell of the array has dedicated sensing circuitry.

38. Apparatus as claimed in claim 34, wherein each cell of the array has a dedicated voltage source.

39. Apparatus as claimed in claim 34, wherein each cell of the array has dedicated control circuitry.

40. Apparatus as claimed in claim 34, wherein the control circuitry is operable to control the switching circuitry for a plurality of cells of the array in sequence.

41. Apparatus as claimed in claim 34, wherein each cell of the array has dedicated photon counting circuitry adapted to update a per-cell photon counter in response to the detection of a discharge.

42. Apparatus as claimed in claim 41, comprising circuitry for reading the per-cell photon counters at predetermined regular intervals.

43. Apparatus as claimed in claim 41, wherein the control circuitry is not necessarily adapted to control the switching circuitry to initiate successive refresh periods at predetermined regular intervals.

44. Apparatus as claimed in claim 34, wherein each cell of the array has dedicated circuitry adapted to determine the timing of a discharge.

45. Apparatus as claimed in claim 34, wherein the control circuitry is operable selectively to operate only one or more subsets of the cells at a time.

46. Apparatus as claimed in claim 34, operable in a mode in which the cells are arranged into a plurality of groups, each group comprising one or more cells, with information regarding light intensity being provided on a per-group basis.

47. Apparatus as claimed in claim 1, wherein the predetermined potential difference is within 50% of the threshold value.

48. Apparatus as claimed in claim 47, wherein the predetermined potential difference is within 25% of the threshold value.

49. Apparatus as claimed in claim 48, wherein the predetermined potential difference is within 5% of the threshold value.

50. Apparatus as claimed in claim 49, wherein the predetermined potential difference is within 2% of the threshold value.

51. Apparatus as claimed in claim 1, wherein the predetermined potential difference exceeds the threshold value by an amount allowing a predetermined length of sensing period before a refresh period is required to recharge the sensor element.

52. Apparatus as claimed in claim 1, wherein the detection of a photon by the detector causes the potential difference across the detector to drop substantially to zero.

* * * * *